Patented May 18, 1937

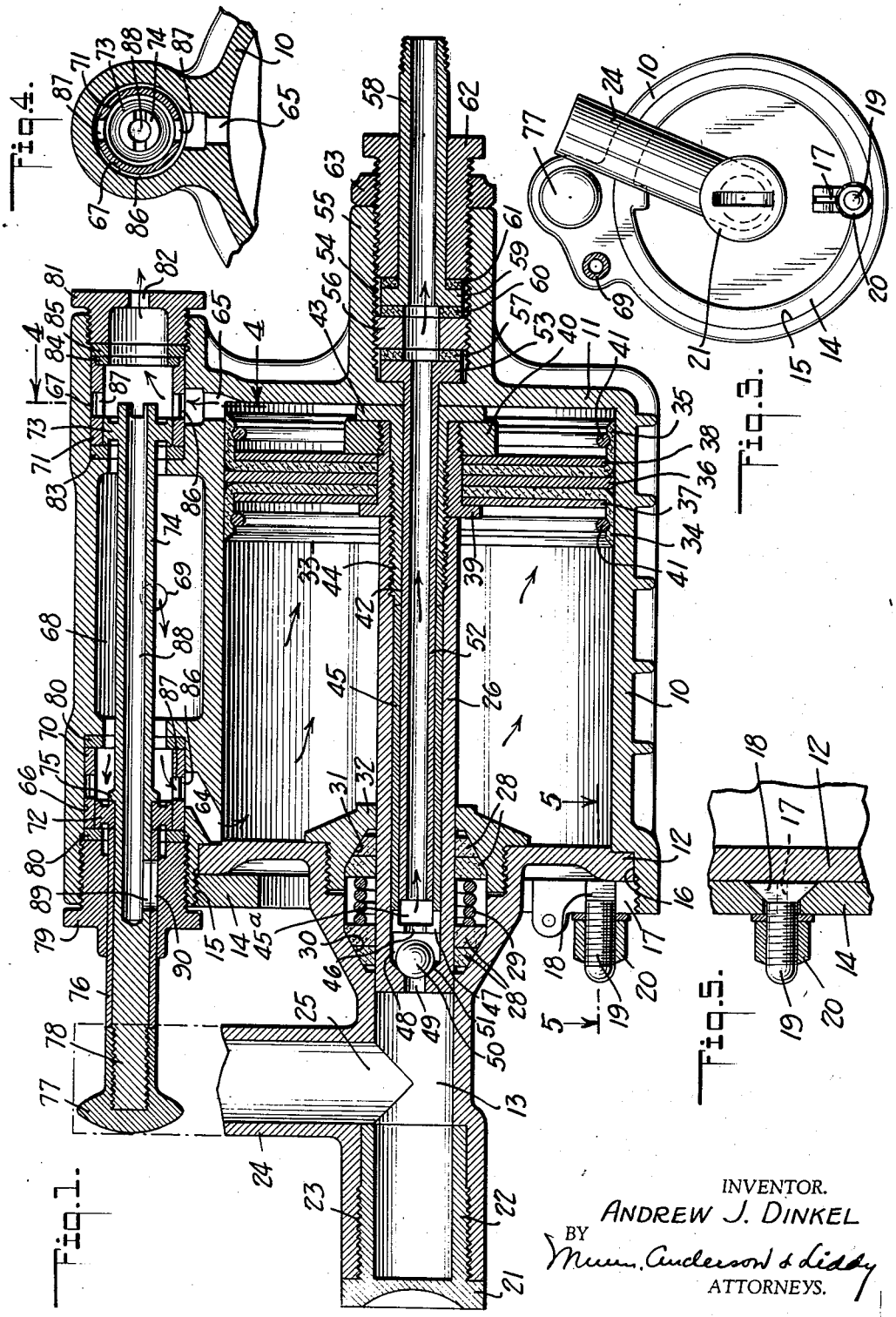

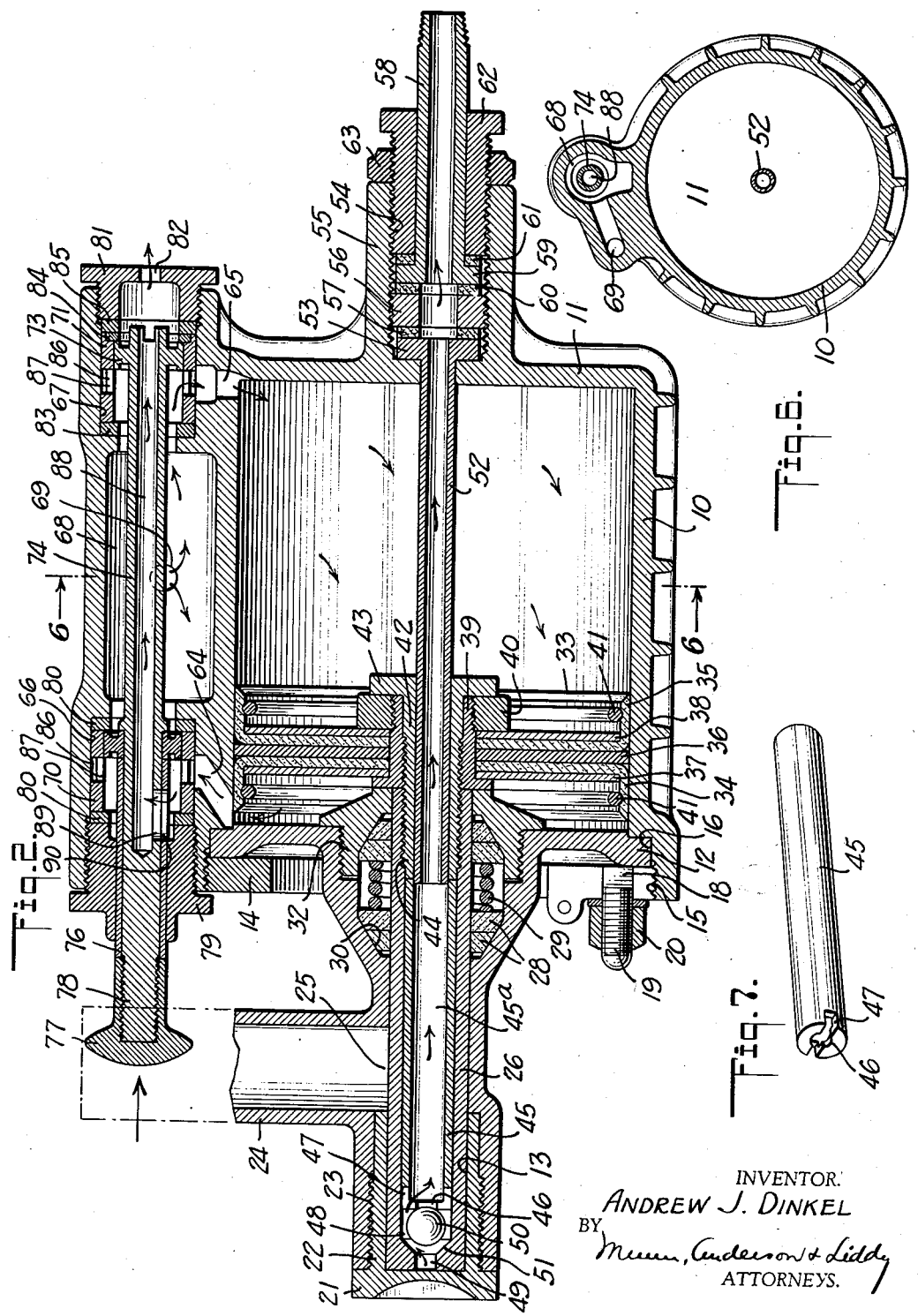

2,080,809

UNITED STATES PATENT OFFICE 2,080,809

GREASE GUN

Andrew J. Dinkel, Yuma, Ariz.

Application April 15, 1935, Serial No. 16,513

6 Claims. (Cl. 221—47.3)

This invention relates generally to devices for forcing lubricant under pressure to the working parts of machinery.

An object of the invention is to provide a grease gun particularly adapted, although not necessarily, for handling hard grease of the type used in lubricating locomotives, and by which such grease can be forced by the compounding action of the gun, under high pressures to the pins and other parts against the high resistance present at the parts to the injection of lubricant, all in such manner that upon each actuation of an operating member, a charge of grease will be separated from a supply and automatically advanced in a plurality of stages at successively increasing pressures against the resistance at the part being lubricated, to the end of greatly simplifying and facilitating the operation of the gun, as well as speeding up the greasing job.

Another object of the invention is to provide a grease gun of the above described character in which the mechanism for compounding the pressure imposed on the grease is extremely simple and compact in its construction and positive in its operation.

A further object of the invention is to provide a grease gun embodying a novel form of control valve for air from an available source of supply under pressure which is utilized to build up tremendous pressure on the grease, all in such manner that upon a release of the valve following a manual operation thereof the valve will be automatically restored to a normal position by the action of the air.

In the accompanying drawings:

Figure 1 is a longitudinal axial sectional view of the grease gun embodying this invention;

Figure 2 is a view similar to Figure 1, and showing another position of the mechanism of the gun;

Figure 3 is a reduced scale view of the grease gun in end elevation;

Figures 4 and 5 are fragmentary sectional views taken respectively on the lines 4—4 of Figure 1 and 5—5 of Figure 1;

Figure 6 is a reduced scale transverse sectional view taken on the line 6—6 of Figure 2;

Figure 7 is a perspective view of a valve cage forming member embodying the invention.

Referring specifically to the drawings, the invention comprises an actuating cylinder 10 having one closed end 11 and its other end open, and closed by a head 12 provided with a hollow axial extension forming a low pressure cylinder 13. The head is secured to the actuating cylinder by a ring 14 threaded at 15 into a recess 16, which receives the head in advance of the ring. The ring 14 is radially split at 17 for coaction at opposite sides of the split with the flared head 18 of a bolt 19 to expand the ring sufficiently for it to be locked to the actuating cylinder when a nut 20 on the bolt is tightened.

The outer open end of the low pressure cylinder 13 is closed by a cap 21 having a tubular shank 22 forming a portion of the bore of such cylinder and externally threaded at 23 into the cylinder, as shown clearly in Figure 1. Intermediate its ends the low pressure cylinder is provided with a tubular hopper 24 communicating at its lower end with the cylinder 13 to provide a grease inlet 25 controlled by a hollow plunger 26 mounted in the cylinder 13 for reciprocating movement from the extreme position shown in Figure 1 to that shown in Figure 2. The inner end of the low pressure cylinder is sealed around the plunger by a packing gland comprising packing rings 28 arranged in pairs and forced in opposite directions axially by a spring 29 into sealing engagement with the plunger under the wedging action of conical surfaces 30 and 31 in the head and in a packing nut 32 respectively, as will be clear from a consideration of Figure 1.

The inner end of the plunger 26 terminates in a double acting piston 33 which works in the actuating cylinder 10 and comprises oppositely cupped packing disks 34 and 35 and metallic disks 36, 37 and 38, the several disks being clamped together by a flanged hub 39 and a nut 40 threaded on the hub. The peripheral flanges of the packing disks are expanded into sealing engagement with the wall of the cylinder 10 by spring rings 41—41. The piston is secured to the plunger by a tubular stud 42, the head 43 of which bears against the nut 40, and the shank 44 of which is externally threaded into the bore of the plunger at its inner end.

The stud 42 also confines in the bore of the plunger a tube 45 having its end which confronts the head of the plunger formed to provide an axial opening 46 intersected by a diametric slot 47. The plunger and tube coact in defining a valve chamber 48, of which an axial port 49 in the head of the plunger forms the inlet and the slot 47 the outlet. The valve chamber 48 contains a ball 50 which is adapted to engage an annular flared seat 51 surrounding the port 49 so as to seal the port during movement of the plunger from the position shown in Figure 2 to that shown in Figure 1. During movement of the plunger in the opposite direction the ball is free of the port 49 and seats in the opening 46 of the tube 45 while leaving the slot 47 open for the passage of grease. The ball thus functions as a check valve to open or close the port 49 according as the plunger is moved in one direction or the other.

Coaxially arranged with respect to the plunger and projecting through the bore of the stud 42 when the plunger occupies the position of Figure 2, is a tubular piston 52 working in the bore of the tube 45, which provides a high pressure cylinder 45a in the plunger 26.

The piston 52 projects axially through the actuating cylinder 10 and its end wall 11, and is provided with a flange 53 which seats against the bottom of an internally threaded pocket 54 formed in a boss 55 projecting from the wall 11. A ring nut 56 threaded into the boss coacts with a packing washer 57 to rigidly secure the piston 52 against displacement.

A tubular stem 58 is provided at one end with a flange 59 interposed between packing washers 60 and 61, and coacts with a threaded plug 62 on the stem to secure the stem to the boss for connection to a flexible hose or to a part to be lubricated. A jam nut 63 is provided on the plug 62 to prevent unscrewing of the latter from the pocket 54.

Air from a source of supply, such as the compressor of a locomotive, is adapted to be admitted to the cylinder 10 at one side or the other of the piston 33 through ports 64 and 65, respectively, which place the respective ends of the cylinder in communication with valve chambers 66 and 67 to which air is adapted to be supplied from an air chest 68 having an inlet 69 adapted for connection to the source of air.

Working in bushings 70 and 71 in the chambers 66 and 67 are piston valves 72 and 73 respectively, and the latter of which is formed integral with a stem 74. The valve 72 which is larger in diameter than the valve 73, is rigidly secured to the stem between a flange 75 thereon and a sleeve 76 slidably receiving the stem and confined thereon by the shank of an operating handle or button 77 which is threaded onto the exteriorly projecting portion 78 of the stem.

The diameter of the sleeve 76 is such that it is slidable through a nut 79 threaded into the valve chamber 66 to confine the bushing 70 between soft metal seats 80—80 for the valve 72. A plug 81, provided with an air exhaust port 82, is threaded into the valve chamber 67 and confines the bushing 71 between a soft metal seat 83 at one end of the bushing and a leather seat 84 and metal washer 85 at the other end of the bushing. These seats and washer can be made of any other suitable material.

It will be noted that the bushings 66 and 67 are provided with annular grooves 86 and openings 87 through the walls of the bushings in the grooves so that air from the chest 68 will be free to flow through one valve chamber or the other through the respective port 64 or 65 to the cylinder, according as the valves 72 and 73 occupy one extreme position or the other.

The stem 74 is provided with an axial passage 88 and a radial slot 89 which is continued through the sleeve 76 at 90 so that in the extreme position of the valves shown in Figure 2, air at one end of the cylinder will be free to exhaust therefrom through the stem and the exhaust port 82 to atmosphere.

The operation of the invention is as follows:

With a quantity or stick of hard grease supplied to the hopper 24 and the air inlet 69 placed in communication with a source of air supply under pressure, the parts of the gun will occupy the position shown in Figure 1, the valves 72 and 73 being urged to this position by the air due to the fact that the valve 72 is of larger diameter than the valve 73 and thus presents a greater surface area to the air. In this position the valve 72 places the cylinder port 64 in communication with the source of air supply, and the valve 73 places the port 65 in communication with the atmosphere so that the air piston 33 will occupy the extreme position at the right hand end of the cylinder 10 and the plunger 26 will uncover the grease inlet 25 so that the stick of grease in the hopper 24 will project into the low pressure cylinder 13 in advance of the head of the plunger 26.

With the stem 58 connected to the part to be lubricated, the handle 77 is pressed to shift the valves 72 and 73 as a unit to the extreme position shown in Figure 2. The source of air supply will now be placed in communication with the right hand end of the cylinder 10 through the port 65 and valve chamber 67, whereas air will be free to discharge from the left hand end of the cylinder 10 through the port 64, slots 89, 90, passage 88 and exhaust port 82 to atmosphere. The piston 33 and the plunger 26 will thus be forced by the air to the extreme position shown in Figure 2. As the head of the plunger 26 passes across the inlet 25, the portion of the stick of grease projecting into the low pressure cylinder 13 will be cut off and forced ahead of the plunger. When the plunger is sufficiently advanced to close the inlet 25, the portion of grease which has been cut off will be trapped in the low pressure cylinder in advance of the plunger and will thus be placed under pressure so as to be forced through the port 49 and to unseat the ball check valve 50, the grease passing around the ball and through the slot 46 into the high pressure cylinder 45a.

The handle 77 is released, thereby permitting the air from the source of supply to act upon the larger valve 72 in automatically restoring the valves 72 and 73 to the extreme position shown in Figure 1. As the right hand end of the cylinder is now vented to atmosphere through the port 65, valve chamber 67 and exhaust port 68, and as the left hand end of the cylinder is now in communication with the source of air through the port 64 and valve chamber 66, the piston 33 and the plunger 26 will be forced to the extreme position shown in Figure 1.

As this movement is initiated, and assuming that the high pressure cylinder 45a, the bore of the fixed piston 52, the stem 58 and the remainder of the line to the part to be lubricated are filled with grease, the resistance at the part to the injection of the grease will cause the ball valve 50 to close the port 49. The previously introduced charge of grease will now be forced by the plunger from the high pressure cylinder 45a into the piston 52 at a much higher pressure than was imposed on the grease by the plunger in the low pressure cylinder, due to the fact that the diameter of the high pressure cylinder is much less than that of the low pressure cylinder.

It will be manifest that each time the handle 77 is pressed and released a charge of grease will be separated from the supply in the hopper and then successively placed in two stages under increasing pressures. It is to be understood that the term "low pressure" for the cylinder 13 is only relative, as actually the pressure created therein is high, but much lower than that created in the cylinder 45a.

I claim:

1. A grease gun comprising a low pressure cylinder having a lateral grease inlet; a plunger working in the cylinder across said inlet so as to advance a charge of grease therefrom and to place the grease under pressure in the cylinder during one stroke of the plunger; the plunger being hollow to form a high pressure cylinder therein and having a port; a check valve controlling said port so as to open during said one stroke of the plunger in order for the charge of grease to be forced into the high pressure cylinder; a stationary tubular piston telescopically received in said high pressure cylinder and into which grease from the latter is forced during the other stroke of the plunger; and means for actuating the plunger.

2. A grease gun comprising an actuating cylinder; a low pressure cylinder having a grease inlet; a piston working in the actuating cylinder; a plunger fixed to the piston and working in the low pressure cylinder to advance grease from the inlet and place the grease under pressure in the low pressure cylinder during one stroke; the plunger being hollow to form a high pressure cylinder therein having an inlet port; a check valve controlling said port so as to open during said one stroke of the plunger in order for the charge of grease to be forced into the high pressure cylinder; a stationary tubular piston telescopically received in said high pressure cylinder and into which grease from the latter is forced during the other stroke of the plunger; and means for admitting fluid under pressure to the actuating cylinder at one side or the other of the piston therein to accordingly actuate the latter and hence the plunger in one direction or the other.

3. A grease gun comprising an actuating cylinder; a low pressure cylinder correlated therewith and having a lateral inlet for grease; a fluid operated piston working in the actuating cylinder; a plunger working in the low pressure cylinder and being hollow to form a high pressure cylinder therein having a grease inlet port at one end; a tubular stud projecting through said piston and having threaded connection with the other end of said plunger so as to secure the latter and piston together; a stationary tubular piston extending through said stud and into the high pressure cylinder; a check valve controlling said port so as to open during one stroke of the plunger in order for a charge of grease to be forced from the inlet of the low pressure cylinder through the latter and into the high pressure cylinder, and to close during the other stroke of the plunger so as to force the charge of grease from the high pressure cylinder into said stationary piston at a higher pressure; and means for actuating the fluid operated piston to move the latter and hence the plunger as aforestated.

4. A grease gun comprising an actuating cylinder; a low pressure cylinder correlated therewith and having a lateral inlet for grease; a fluid operated piston working in the actuating cylinder; a plunger working in the low pressure cylinder and being hollow to form a high pressure cylinder therein, having a grease inlet port at one end; a tubular stud projecting through said piston and having threaded connection with the other end of said plunger so as to secure the latter and piston together; a stationary tubular piston extending through said stud and into the high pressure cylinder; a tube confined in said high pressure cylinder by said stud and being constructed at one end to provide a stop for a ball valve while permitting grease to flow around the ball into the tube; a ball valve controlling said port so as to open during one stroke of the plunger in order for a charge of grease to be forced from the inlet of the low pressure cylinder through the latter and into said tube of the high pressure cylinder, and to close during the other stroke of the plunger so as to force the charge of grease from the high pressure cylinder into said stationary piston at a high pressure; and means for actuating the fluid operated piston to move the latter and hence the plunger as aforestated.

5. A lubricant gun comprising a body having a cylinder part, a lubricant supply means supported by the body, an ejector for receiving lubricant from the supply means and discharging it from the gun, the ejector comprising a tubular core on the body forming the outlet of the ejector, and a lubricant ejecting plunger movable on the core to eject lubricant through the same, and means for operating the ejector including a power piston surrounding the core and operable in the cylinder part to actuate the plunger.

6. A lubricant gun comprising a body having a cylinder part, a lubricant supply means supported by the body, an ejector for receiving lubricant from the supply means and discharging it from the gun, the ejector comprising a tubular core relatively stationary with respect to the body and forming the lubricant outlet of the ejector, a barrel on the body, a tubular ejecting plunger operable in the barrel and having the core entering it whereby it is operable to eject the lubricant through the core, and valve means controlling passage through the barrel and core, and a piston on the plunger movable in the cylinder part to operate the plunger.

ANDREW J. DINKEL.